United States Patent
Larkin et al.

[11] 3,900,874
[45] Aug. 19, 1975

[54] DIVERSITY COMBINATION OF RADAR SIGNALS

[75] Inventors: Robert S. Larkin, Denville; Nean K. Lund; Charlton E. Williams, both of Berkeley Heights, all of N.J.

[73] Assignee: Bell Telephone Laboratories, Incorporated, Murray Hill, N.J.

[22] Filed: Mar. 27, 1963

[21] Appl. No.: 268,488

[52] U.S. Cl............................ 343/16 R; 343/100 LE
[51] Int. Cl.²....................... G01S 3/30; G01S 9/02
[58] Field of Search...... 343/100.12, 16.1, 16, 16 R, 343/100 LE

*Primary Examiner*—Malcolm F. Hubler
*Attorney, Agent, or Firm*—H. C. Hart; A. E. Hirsch

EXEMPLARY CLAIM

2. In an information processing system having a plurality of input conductors carrying individual signals of which at most two are at any instant principal signals, the others being spurious, the identities of said principal signals changing from instant to instant,
and having means for utilizing said principal signals, apparatus for rejecting spurious signals which comprises
means for continuously additively combining all of said signals to develop a reference threshold of a magnitude in excess of the majority of said signals,
means for comparing each individual signal with said reference threshold to develop an indication for each signal which exceeds said threshold,
means for counting the indications thus developed,
means for developing a control signal in response solely to a count of three-or-more indications,
means responsive to said control signal for developing a threshold increment,
and means for passing to said utilization means only those video signals that exceed said threshold and said threshold increment.

6 Claims, 3 Drawing Figures

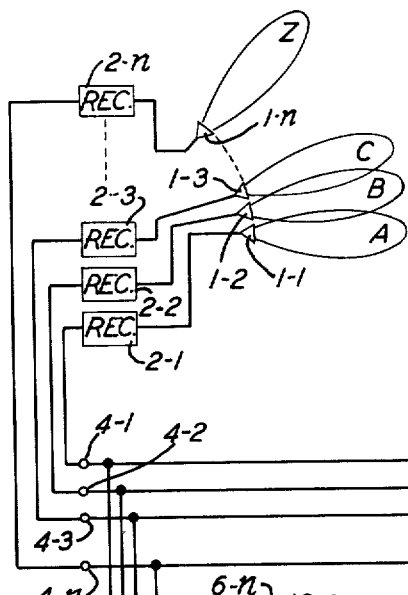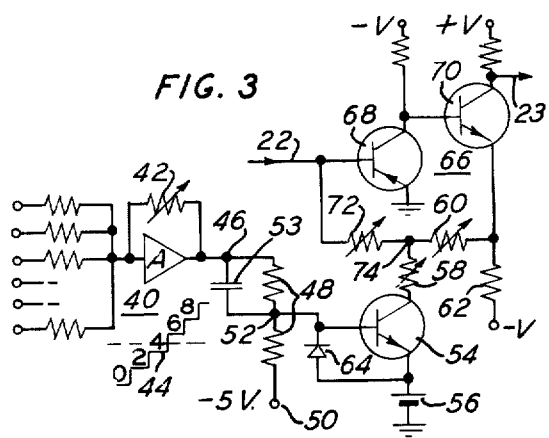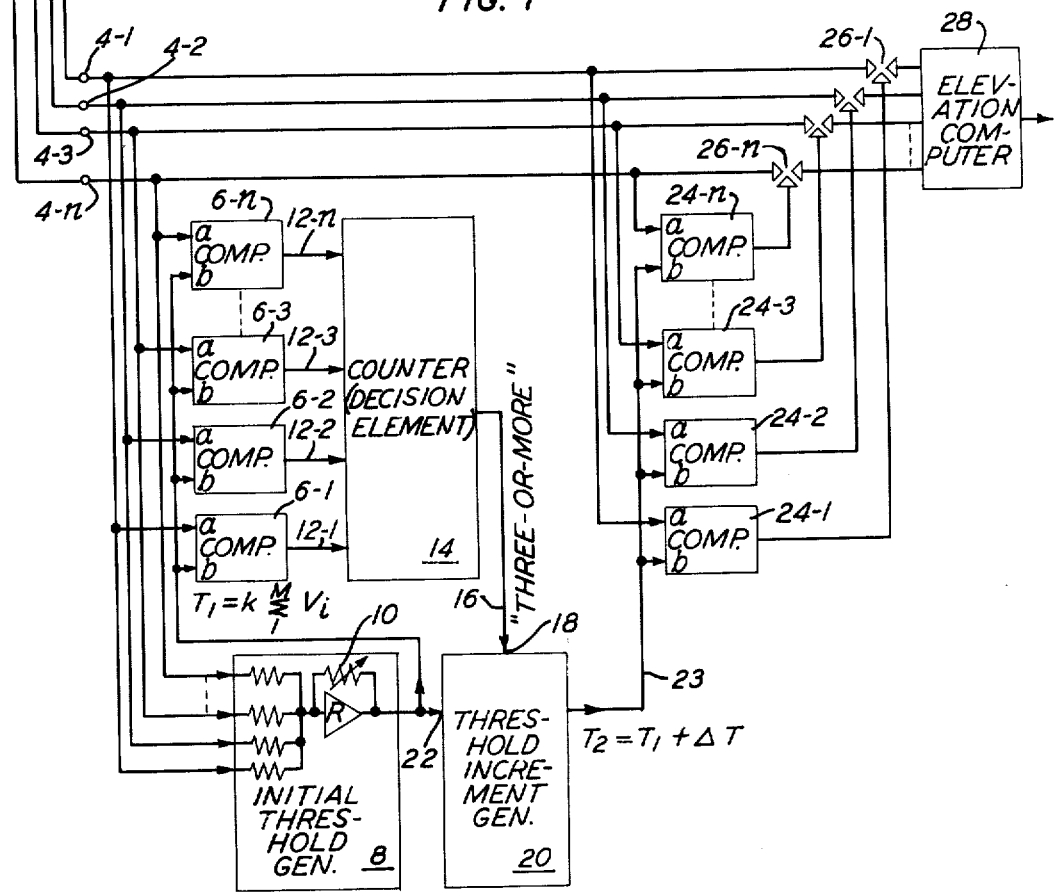

DIVERSITY COMBINATION OF RADAR SIGNALS

This invention deals with the sorting and classification of signals—e.g., incoming pulse echoes in a radar system—with the object of segregating the significant members of a group of such signals from the spurious members and so providing for the acceptance of the former for further processing and the rejection of the latter.

Situations in which such a signal-sorting operation is called for are typified by a target acquisition radar system of the stacked-beam type in which a plurality of receptors are mounted in a common vertical plane with their axes of greatest sensitivity fanned apart in elevation. Incoming pulse echoes picked up by the several receptors are converted by receivers into electrical signals, one from each receptor and from these signals, or a selected subgroup of them, a computer determines the angle of elevation of a target at which the pulse echoes originate.

The sensitivity pattern of each receptor is characterized by a single main lobe coinciding with the receptor axis and, surrounding it in pairs, side lobes of various orders (primary, secondary, etc.) of various magnitudes or strengths and spaced from the main lobe by various angles in dependence on the structure of the receptor. From the standpoint of the computation of target elevation, side lobe responses are spurious and, if not rejected, give rise to erroneous estimates of target elevation. Consequently, it is of importance to reject the side lobe responses. But because the amplitude of any received signal by itself carries no information as to whether it represents a main lobe response or a side lobe response, such rejection presents a problem.

If attention could safely be restricted to a target that is located on the main lobe axis of some single receptor, it would be a simple matter, by turning to account the diversity techniques developed in the field of long distance radio communication, to pick the strongest single response, reject all the others and conclude that the target is located on the beam axis of the receptor giving the strongest response. This could readily be done, for example, by arranging that the strongest one of the group of signals provide a threshold bias for all receivers in which case all but the one whose response is the strongest are biased beyond cutoff and only the strongest signal comes through. But for precise determination of the direction of a target, the line of sight to which may lie between the axes of two adjacent receptors, it is imperative to accept the two corresponding main lobe responses, even though one be significantly weaker than the other.

According to one approach to this problem, represented by Meyer U.S. Pat. No. 3,072,903, the strongest response is picked and, in addition, its two closest neighbors on either side of it. According to another approach, represented by Chambers U.S. Pat. No. 3,070,795, the two or three strongest responses are picked. In each case at least one, and sometimes two of the three signals accepted, are derived from side lobe responses and hence are spurious. Moreover, any such system, by insisting at all times on the acceptance of two or three responses, fails to take the fullest advantage of a situation in which the target is, indeed, on the main lobe axis of some one receptor in which case it, and it alone, should be passed along to the computer as containing the significant information.

The present invention provides for the acceptance of a single main lobe response or, in the case of an off-axis target, of two adjacent main lobe responses and, when no target is in the field of view of the receptors, of none at all. It prevents acceptance of three or more responses, thus insuring that no signal accepted shall be due to a side lobe response. It attains this result by the introduction of criteria of two different kinds which the signals must meet before they are accepted for processing. The first criterion is one of amplitude alone: For provisional acceptance a signal must exceed a first threshold in excess of the amplitudes of the large majority of individual signals.

This first threshold is developed by summing or averaging the signals of all the receivers of the set. By adjustment of the gain in a control path, its level is set somewhat higher than the average, e.g., about 10 decibels higher. While the individual signals of the group are subject to considerable fluctuations, these fluctuations are incoherent and so, because of the nature of the averaging process, the first threshold is much steadier than any individual signal.

When no target is in the field of view of the system, no individual signal is very much stronger than the average and hence none exceeds the first threshold. When a target comes into the field of view of the system, it is either on the axis of some one receptor or between the axes of two adjacent receptors and one strong main lobe response takes place or two adjacent main lobe responses of somewhat lesser strength take place. The signals derived from these main lobe responses exceed the first threshold thus set and are usually accompanied by one or two primary side lobe responses which may also exceed the first threshold. But the first threshold suffices to reject all side lobe responses of the second and higher orders. Indeed this is its first function. A second function is to provide a moderately steady point of departure for the next step.

The second criterion is a numerical one: Signals which pass the first test are counted and, if the result of the count is three or more, an incremental threshold is generated of a level approximately midway between the main lobe response of a receptor for an on-axis target and the side lobe response of the same receptor for the same target, at the same distance, on the primary side lobe axis. For receptors of a common type, the main lobe response exceeds the primary side lobe response by 20–30 decibels and, accordingly, the magnitude of the incremental threshold is selected at 10–15 decibels. Thus, it lifts the net threshold by this amount above the original threshold. Except in most unusual circumstances, rarely encountered, this net threshold suffices to reject all side lobe responses while still passing the main lobe responses of two adjacent antennas.

When, to the contrary, two, at most, of the signals exceed the first threshold—i.e., (two exceed it, only one exceeds it, or none exceeds it) the incremental threshold is not introduced and the zero, one, or two signals that pass the original threshold, corresponding to no target, a target on the axis of a specified receptor, or a target between the axes of two adjacent receptors, are passed along to the computer for processing.

The invention will be fully apprehended from the following detailed description of an illustrative embodiment thereof taken in conjunction with the appended drawings in which:

3

FIG. 1 is a block schematic diagram showing apparatus embodying the invention;

FIG. 2 is a block schematic diagram illustrating one form of voltage comparator suitable for use in the apparatus of FIG. 1; and FIG. 3 is a schematic circuit diagram illustrating the construction of a decision element and a threshold increment generator for use in the apparatus of FIG. 1.

Referring now to the drawings, FIG. 1 shows an array of radar receiving horns 1-1, 1-2 . . . 1-$n$ disposed in a common plane with their axes fanned apart in elevation. In an array of 15 such horns, their angular spacings may be 6°. In an array of 45 such horns, their angular spacings may be 2°. Each horn is connected to its own receiver 2-1, 2-2, etc., which converts its response to incoming radiation into a voltage and the individual voltages appear on individual conductors 4. The "main lobe" portions of the response patterns of the several horns are indicated at A, B, C, etc.

The individual voltages $V_1$, $V_2$, . . . $V_n$ appearing on the several conductors 4 are compared in magnitude by comparators 6 with a common reference voltage or threshold $T_1$ which is generated in the following fashion. Branch leads from the several incoming conductors 4 are applied to the several input points of a threshold generator 8 constituted of a summing amplifier of the type described in Swartzel U.S. Pat. No. 2,401,779. As is well known, the output voltage of such a summing amplifier is proportional to the sum of its input voltages. The constant of proportionality is controlled by adjustment of the amplifier gain and this, in turn, is conveniently effected by variation of the resistance 10 in a feedback path with which the amplifier is provided. The constant of proportionality is to be adjusted to a magnitude such that the reference voltage $T_1$ exceeds the large majority of the individual input voltages $V_1$, $V_2$, etc., but, when a target is within the field of view of the array of horns 1, not all of them. This reference voltage, as it appears at the output point of the summing amplifier, is applied in common to the lower input points of the comparators 6. Each comparator, therefore, delivers a control signal on its output conductor 12 when, and only when, the response signal applied to its upper input terminal exceeds the reference voltage. Advantageously, the outputs of the several comparators, when they exist, are of uniform amplitudes. For example, each comparator may be proportioned to deliver an output of two volts when its input signal exceeds the reference voltage and of zero volts otherwise.

In accordance with the invention, the two-valued signals appearing on the output conductors 12 of the several comparators 6 are applied to a counter or decision element 14 of which the details are described below. This element is proportioned to deliver on its output conductor 16 a signal of one magnitude when it receives two inputs, one input, or no inputs at all, and to deliver an output signal of significantly different magnitude when it receives inputs to the number of three or more.

The "three-or-more" output of the decision element 14 is applied to the control terminal 18 of a threshold increment generator 20, of which the details are described below, and to the input terminal 22 of which the initial threshold signal $T_1$ is applied. Accordingly, in the absence of a three-or-more signal, the initial threshold voltage $T_1$ passes through the increment generator 20 without alteration but, when the three-or-more control signal is applied to it, the threshold increment generator 20 introduces a threshold increment $\Delta T$. On the logarithmic basis the increment is added to the initial threshold and, in the present illustrative example, the increment $\Delta T$ may advantageously be of approximately 15 decibels, the increment generator 20 being proportioned accordingly. On the nonlogarithmic basis the magnitude of the initial threshold is increased by a factor of approximately 5 which corresponds roughly on the logarithmic scale to 15 decibels.

The net threshold $T_1 + \Delta T$, i.e., the original threshold, unmodified or modified by the increment, is applied, by way of a conductor 23, to the lower input points of the comparators 24 of a second set to whose upper input points the original response signals $V_1$, $V_2$, etc., are also applied. Evidently, any incoming signal which exceeds the initial threshold $T_1$ by more than the magnitude of the increment $\Delta T$ passes through its second comparator 24, while an incoming signal which is below the initial threshold $T_1$ or less than 15 decibels above it, fails to pass the second comparator 24. Whenever a comparator of the second set is thus actuated, its output, applied to the control terminal of a switch 26, establishes a conduction path for the corresponding incoming signal to the similarly numbered input point of an elevation computer 28. Each of the switches 26, shown schematically the better to illustrate the principles of the invention, is advantageously instrumented with a high-speed semiconductor electronic component.

Analysis of the sensitivity patterns—i.e., the main lobe-side lobe ratios of typical receptors and statistical examination of incoming radar signals derived from them, show that, when the initial threshold $T_1$ is selected at a level such that only the strongest minority—e.g., three, four or five out of 45—of the incoming signals $V_1$, $V_2$, etc., are of amplitudes such as to pass it, the introduction of the incremental threshold $\Delta T$ of 15 decibels results in the elimination of two, three or four of these so that, in the end, either one signal or two signals are applied to the elevation computer 28 and, in the absence of a target, no signals at all. The two signals thus applied to it in the presence of a target are presumptively adjacent main lobe signals and from their identities and relative magnitudes the elevation computer 28 can determine the elevation of the corresponding target.

The elevation computer 28 itself may be of any appropriate construction. Inasmuch as it constitutes no part of the present invention, it will not be further described. Among a number of alternatives, the computer described in Chambers U.S. Pat. No. 3,070,795 is suitable. Refinements can be introduced into the computer such as to prevent the completion of a computation based on the acceptance of signals derived from nonadjacent receptors.

Each individual comparator, either of the first set or of the second set, may be of any suitable construction, an illustrative embodiment being shown in FIG. 2. Here the first apparatus component is a differential amplifier 30, preferably of the polarized variety, such that it delivers an output when, and only when, the magnitude of the signal applied to its upper input point exceeds that applied to its lower input point. The excess is increased in strength by a high gain amplifier 32, and the output of the amplifier 32 is severely clipped by a limiter 34. Thus, when the level of the signal applied to the upper input point of the differential amplifier 30 is equal to or less than that applied to the lower input point, the output of the limiter 34 has a first value 36 and, for any excess of the first input signal over the second input signal, the limiter output takes on a second value 38, significantly different from the first.

The decision element 14 may likewise take any of a number of different forms. Inasmuch as it is required only to distinguish between a first condition in which it receives two input signals or fewer and a second condition in which it receives three input signals or more but is not required to distinguish, in the first case, between zero, one and two, or in the second case, between three, four, etc., it need not in fact be a counter in the literal sense.

FIG. 3 shows a suitable circuit arrangement for the decision element 14 and the threshold increment generator 20 together. At the left-hand portion of FIG. 3 is shown a summing amplifier 40, as described in Swartzel U.S. Pat. No. 2,401,779, to the several input terminals of which the several two-valued output signals 36, 38 of the comparators 6 of the first set are to be applied. Given that each of these comparators 6 is proportioned, as described above, to deliver an output of 2 volts when the incoming signal exceeds the reference voltage and of 0 volts otherwise, each of the several input terminals of the summing amplifier 40 carries a signal of 2 volts or of 0 volts. By adjustment of the magnitude of the loss 42 in the feedback path of the amplifier, its output voltage characteristic, for the various input conditions, is in the form of a staircase 44 of which each tread is 2 volts higher than its predecessor.

This staircase voltage 44 is applied to the upper end terminal 46 of a voltage divider 48 of which the lower end terminal 50 is connected to a point of negative potential such as −5 volts. The terminal 46 thus provides the instrumentation of the input point 18 of FIG. 1. An intermediate point 52 of the voltage divider 48 is connected to the base electrode of a P-type transistor 54 of which the emitter electrode is connected through a small battery 56 to ground while its collector electrode is connected through resistors 58, 60, 62 to a point of fixed negative potential. Its base is returned to its emitter through a protective diode 64.

To accelerate the response of the transistor 54 to a change in its input voltage, as it appears at the terminal 46, the upper one of the two resistors which constitute the voltage divider 48 may advantageously be bypassed by a small capacitor 53.

The threshold increment generator 20 may be constituted of a variable gain amplifier 66 of which the gain is altered under control of the output of the decision element 14. As shown, it comprises an N-type transistor 68 and a P-type transistor 70 connected in tandem, the collector of each one being connected to a point of fixed potential of appropriate polarity, the emitter of the second one 70, through the resistor 62 to a point of fixed negative potential, and the emitter of the first transistor 68 being connected to ground. The emitter of the second transistor 70 is returned through a feedback path consisting of two resistors 60, 72, one or both of which being advantageously variable, to the base electrode of the first transistor 68. The common point 74 of the two resistors of this feedback path is connected through the padding resistor 58 to the collector electrode of the P-type transistor 54.

The operation of this circuit arrangement is as follows. In the absence of a signal applied to the base electrode of the P-type transistor 54, the potentials on its electrodes have such magnitudes that it is nonconductive. Hence, none of the feedback current of the amplifier 66 is diverted from the feedback path at the common point 74 and the gain of the amplifier 66 is held down by the presence of substantial negative feedback. In the illustrative example the feedback resistors 60, 72 are proportioned to provide a gain of unity. The same holds when the summing amplifier 40 receives a 2-volt output from one comparator 6 or two 2-volt outputs from two of them. But when three such 2-volt outputs are present together, the output voltage of the summing amplifier 40 rises to 6 volts and, by virtue of the voltage drop along the voltage divider 48, the base electrode of the P-type transistor 54 is driven to a positive potential of one half volt, thus to drive the transistor 54 substantially instantaneously into a fully conductive state. It then draws off a fraction of the current from the feedback path of the amplifier 66, thus partially disabling the feedback, whereupon the gain of the amplifier 66 rises. By adjustment of the magnitude of the resistor 58 which extends from the junction point 74 of the feedback path to the collector of the P-type transistor 54, the extent to which the feedback is thus disabled is readily adjustable over a wide range. In the present illustration the elements are to be adjusted to such values that, when the P-type transistor 54 conducts, the amplifier 66 provides a gain of 15 decibels. The initial threshold signal, derived from the summing amplifier of the threshold generator 8, being applied to input terminal 22 of the two-transistor amplifier 66, the amplification thus provided supplies a threshold increment ΔT of 15 decibels. This is supplied, as described above, and over the output conductor 23 of the threshold increment generator 20 of FIG. 1 (the collector terminal of the transistor 70 of FIG. 3) to the lower input points of all the comparators 24 of the second set.

What is claimed is:

1. In a target-acquisition radar system of the stacked-beam type, having a plurality of like receptors disposed with their axes of maximum sensitivity fanned apart by equal angular increments, the sensitivity of each receptor being defined by a single main lobe and, surrounding said main lobe, at least a pair of side lobes, receivers individual to the several receptors for developing a like plurality of video signals, one from each receptor, and an angle computer for determining from selected ones of said video signals the direction of a source of incoming radiation, means for blocking nonsignificant ones of said video signals, which comprises means for continuously additively combining all of said video signals to develop a reference signal of a magnitude in excess of the majority of said video signals, means for comparing each individual video signal with said reference signal as a threshold to segregate those video signals whose magnitudes exceed said threshold, means for counting the video signals thus segregated, means for developing a control signal in response solely to a count of three-or-more and independent of the amplitudes of said segregated signals, means responsive to said control signal for developing a threshold increment, and means for passing to said computer only those video signals that exceed said threshold and said threshold increment.

2. In an information processing system having a plurality of input conductors carrying individual signals of which at most two are at any instant principal signals, the others being spurious, the identities of said principal signals changing from instant to instant, and having means for utilizing said principal signals, apparatus for rejecting spurious signals which comprises means for continuously additively combining all of said signals to develop a reference threshold of a magnitude in excess of the majority of said signals, means for comparing each individual signal with said reference threshold to develop an indication for each signal which exceeds said threshold, means for counting the indications thus developed, means for developing a control signal in response solely to a count of three-or-more indications, means responsive to said control signal for developing a threshold increment, and means for passing to said utilization means only those video signals that exceed said threshold and said threshold increment.

3. In an information processing system having a plurality of input conductors carrying individual signals of which at most two are at any instant principal signals, the others being spurious, the identities of said principal signals changing from instant to instant, and having means for utilizing said principal signals, apparatus for rejecting spurious signals which comprises means for continuously additively combining all of said signals to develop a reference signal of a magnitude in excess of the majority of said signals, means for comparing each individual signal with said reference signal as a threshold to segregate those signals whose magnitudes exceed said threshold, means for counting the signals thus segregated, means for developing a control signal in response solely to a count of three-or-more, and independent of the amplitudes of said segregated signals, means responsive to said control signal for developing a threshold increment, and means for passing to said utilizing means only those signals that exceed said threshold and said threshold increment.

4. In an information processing system having a plurality $n$ of input conductors carrying individual signals of fluctuating amplitudes of which at most a lesser number $m$ are at any instant significant, the others being spurious, the identities of said significant signals changing from instant to instant, and having means for utilizing said significant signals, apparatus for rejecting spurious signals which comprises means for continuously additively combining all of said $n$ signals to develop a first reference threshold of a magnitude in excess of the majority of said signals, means for comparing each individual signal with said reference threshold to develop an indication for each signal that exceeds said threshold, means for developing a control signal in response solely to the simultaneous presence of a number $r$ of said indications in excess of said number $m$, means responsive to said control signal for developing a threshold increment and for combining it with said first threshold to provide a second threshold of a magnitude intermediate between said first threshold and the greatest of said signals, and means for passing to said utilization means only those signals that exceed said second threshold.

5. Apparatus as defined in claim 4 wherein the comparing means comprises a polarized differential amplifier, a high gain amplifier, and a limiter, connected together in tandem in the order named.

6. Apparatus as defined in claim 4 wherein the threshold increment generator comprises an amplifier proportioned to provide a gain of the magnitude of said increment, a degenerative feedback path extending from the output point of the amplifier to its input point for reducing its gain substantially to unity, a normally established auxiliary path extending from a point of said feedback path to a point of fixed potential for largely disabling said feedback path, and means responsive to said control signal for disestablishing said auxiliary path.

* * * * *